United States Patent
Gravningen et al.

(10) Patent No.: US 6,942,194 B2
(45) Date of Patent: Sep. 13, 2005

(54) GATE VALVE

(75) Inventors: Roar Gravningen, Kongsberg (NO);
Joern Syvertsen, Skollenborg (NO);
Anders Nygaard, Darbu (NO); Hege Lill Birkeland, Kongsberg (NO); Helge Hjallen, Kongsberg (NO)

(73) Assignee: Danfoss Esco AS, Kongsberg (NO)

( * ) Notice: Subject to any disclaimer, the term of this patent is extended or adjusted under 35 U.S.C. 154(b) by 33 days.

(21) Appl. No.: 10/471,855

(22) PCT Filed: Mar. 21, 2002

(86) PCT No.: PCT/NO02/00117

§ 371 (c)(1),
(2), (4) Date: Sep. 12, 2003

(87) PCT Pub. No.: WO02/077504

PCT Pub. Date: Oct. 3, 2002

(65) Prior Publication Data

US 2005/0098756 A1 May 12, 2005

(30) Foreign Application Priority Data

Mar. 24, 2001 (DE) .......................... 101 14 566

(51) Int. Cl.⁷ ................................................. F16K 3/00
(52) U.S. Cl. ..................... 251/329; 251/366; 137/15.23
(58) Field of Search ................................ 251/327, 328,
251/329, 358, 362, 366; 137/15.23

(56) References Cited

U.S. PATENT DOCUMENTS

| | | |
|---|---|---|
| 2,934,313 A | 4/1960 | Allen |
| 3,331,582 A | 7/1967 | Ford |
| 3,765,647 A | 10/1973 | Grove et al. |
| 4,009,727 A | 3/1977 | Bailey |
| 4,703,915 A | 11/1987 | King |
| 4,881,719 A | 11/1989 | Bowman |
| 5,279,320 A | 1/1994 | Freudendahl |
| 5,335,910 A | 8/1994 | Tanzer et al. |
| 5,560,587 A | * 10/1996 | McCutcheon et al. ...... 251/327 |

FOREIGN PATENT DOCUMENTS

| | | |
|---|---|---|
| DE | 43 25 192 A1 | 2/1994 |
| EP | 0 809 054 A1 | 3/1997 |
| EP | 0 943 850 A1 | 9/1999 |
| GB | 762830 | 11/1954 |

* cited by examiner

*Primary Examiner*—Justine R. Yu
*Assistant Examiner*—Peter deVore
(74) *Attorney, Agent, or Firm*—McCormick, Paulding & Huber LLP

(57) ABSTRACT

The invention relates to a gate valve with a housing, having an inlet and an outlet, between which a flow area is arranged, with a sealing insert in the flow area and a sliding element cooperating with a contact area of the sealing insert in the closed state. In a gate valve of this kind, the function must be improved. For this purpose, the sealing insert has a rigid body, which is permanently connected with at least one additional area with a lower rigidity.

38 Claims, 8 Drawing Sheets

GATE VALVE

CROSS-REFERENCE TO RELATED APPLICATIONS

This application is entitled to the benefit of and incorporates by reference essential subject matter disclosed in International Application No. PCT/NO02/00117 filed on Mar. 21, 2002 and German Patent Application No. 101 14 566.7 filed on Mar. 24, 2001.

FIELD OF THE INVENTION

The invention relates to a gate valve with a housing, having an inlet and an outlet, between which a flow area is arranged, with a sealing insert in the flow area and a sliding element cooperating with a contact area of the sealing insert in the closed state.

BACKGROUND OF THE INVENTION

A gate valve of this kind is known from U.S. Pat. No. 2,934,313. The gate valve shown here has a four-part housing with a housing bottom part, on which a housing cover is fixed with bolts. On two sides facing each other, the housing bottom part and the housing cover form circular openings, each having a thread. A pipe body with a mating thread can be screwed onto each of the two threads. All four parts form a flow pipe. The flow cross-section of this pipe can be closed by a sliding element, which can be lowered from the housing cover transversal to the flow direction of the flow pipe. For sealing the touch areas between the housing parts and the contact areas between the sliding element and the housing, the gate valve has a scaling insert made of rubber. The sealing insert has a tubular shape. Inside the sealing insert, the flow cross-section is substantially limited by metal rings, which are inserted in the sealing insert. The metal rings serve the purpose of keeping the flow cross-section inside the sealing insert clear.

U.S. Pat No. 5,279,320 shows a gate valve with a sliding element, which has a groove on each side. When opening and closing the gate valve, the sliding element will be guided via the grooves through corresponding tracks on the gate valve housing. The sliding element has a plastic-coated core. In the area of the grooves, the coating of the core is made of a hard polymer material to reduce the friction. In the remaining areas, in which the sliding element bears on the housing in the closed state, the coating consists of a soft polymer material. This ensures a good sealing.

DE 43 25 192 A1 shows a disk gate valve. Here, an assembly and disassembly in the movement direction of the gate valve is possible. For this purpose, the disk gate valve has a sliding housing, which is divided into a housing top part and a housing bottom part. A sealing lining with a circular opening is built into the sliding housing. When a replacement of the sealing lining is required, the housing top part can now be removed from the housing bottom part together with the sealing lining. Subsequently, the sealing lining on the housing top part can be replaced. Further, the sealing lining has a separate cross sealing, which can be removed separately from the remaining sealing lining when disassembling the disk gate valve.

In operation, for example in utility water systems, gate valves must ensure a reliable closing for a relatively long life (up to 50 years).

SUMMARY OF THE INVENTION

For this purpose, the known gate valves have relatively soft and simply shaped sealings. These sealings must be relatively tightly fixed in the housing or applied to the individual elements as coatings. Thus, it is prevented that during operation the sealings can be deformed by the existing fluid pressure, which will damage them or make them obstruct the free flow. In the known gate valves, with a tubular flow area; this is therefore substantially limited by housing parts or other supporting elements of a relatively robust material.

The invention is based on the task of improving the reliability of a gate valve, in that it provides a gate valve having a housing which comprises a bottom part and a top part separated by a flange connection; a first side part comprising a housing inlet and a second side part comprising a housing outlet; clamping connections between said first side part and the bottom and top part s and between said second part and the bottom and top parts, respectively; and a sealing insert clamped between said bottom part, said top part and the said first and second parts; and a sliding member adapted for sliding movement in said housing between a first position in which it establishes a gate barrier between said inlet and said outlet and a second position in which said gate barrier is removed, said sealing insert having an opening opposing said inlet and said outlet, and further having a contact area adapted for sealing contact with said sliding member during said member's sliding movement between said positions, said sealing contact establishing said barrier when said sliding member is in said first position. The invented gate valve is characterized in that the sealing insert comprises a rigid body permanently connected to areas having less rigidity than said rigid body, said areas with less rigidity including said contact area and clamped areas in said flange connection and areas clamped between said first side part and the bottom and top parts and between said second side part and the bottom and top parts.

The insert according to the invention is thus intended for assembly in a gate valve housing having an inlet and an outlet, between which a flow area is arranged, said valve insert comprising a tubular part arranged in the flow area and adapted for receiving of a sliding element. The insert is characterized in that the tubular part comprises a rigid body of which at least a portion is adapted for sealing engagement with a portion of said sliding element and permanently connected to a material of a rigidity less than that of said rigid body.

It must be stressed that the term "sealing insert" describes an individual element, which can also be handled independently of the other components of the gate valve. The additional area partly also accomplishes a sealing function and can thus, for convenience, also be called sealing area.

The rigid body makes it possible to give the sealing insert almost any desired shape and size, without requiring stabilisation through additional supporting arrangements. For example, a sealing insert of this kind can also have large openings or a tubular shape, whose free cross-section is kept open by the rigidity of the sealing insert. Thus, it is possible to use a large variety of sealing insert shapes. The sealing inserts can also have relatively complex shapes. This newly acquired freedom in the use of sealing inserts now makes it possible to develop large inner areas of the gate valve by means of a corresponding sealing insert. In this connection a material can be used for the sealing insert, which is more easily and accurately workable than the housing of the gate valve. In this way, different areas of the gate valve can be made with a higher accuracy and also more easily. Especially in areas, which cooperate with the sliding element, this improved accuracy is a large advantage. Exactly here, the sealing insert can give an improved sealing and a reduced material wear. The remaining areas can still be made of robust materials, like for example cast. Further to the exact shapability of the sealing insert, the additional area with the reduced rigidity can also provide a good sealing in desired areas. It is no longer required to provide separate sealings. On the contrary, a sealing is formed by sections or areas of the additional area with reduced rigidity, which forms one unit with the more rigid body. Additionally, the one-unit embodiment of the rigid body and the additional area causes a substantial simplification of the assembly. Further, the permanent connection ensures improved sealing properties of the sealing insert. The connection may, for example, be achieved through bonding.

It is particularly advantageous that the permanent connection occurs on the molecular level. This ensures an optimum connection between the individual areas of the sealing insert. Thus, the sealing properties of the sealing insert are improved.

It is favourable that the sealing insert has a plastic material. The use of the plastic material ensures a simple and exact working of the sealing insert. Further, the use of a plastic material reduces the manufacturing costs of the sealing insert.

It is advantageous that the plastic material has a rigid and a soft material component, the rigid body being formed substantially by the rigid material component and the additional area being formed substantially by the soft material component. This use of two material components of plastic material provides a good connection between the different areas of the sealing insert. Thus, the sealing properties of the sealing insert are improved. Further, in this way also relatively complex shapes of the sealing insert can be made relatively easily and exactly.

Further, it is favourable that the rigid material component is made of polyoxymethylene (POM). The use of this plastic material enables a high degree of accuracy during production of the sealing insert. A subsequent working of a sealing insert made of this plastic material can be limited to a trimming.

It is advantageous that the soft material component is made of ethylene/propylene diene monomer (EPDM). The use of this plastic material gives additional areas with a high flexibility. Thus, again, a relatively good sealing can be achieved.

In a further advantageous embodiment, a filling material is arranged between the sealing insert and the housing. Through the use of such a filling material, the retaining of the sealing insert in the housing can be optimised. Thus, possible deformations of the sealing insert during operation can be reduced. Further, the filling material provides a good sealing between the sealing insert and the housing, so that here slack water cannot gather.

In a further or alternative embodiment it is ensured that the sealing insert is provided with holes. Through these holes, water can penetrate to an area between the sealing insert and the housing. Usually, the penetration of water can never be completely avoided. When no additional measures are taken, there is a risk that the water remains there and that, for example, microorganisms may develop. Particularly when controlling drinking water with a gate valve, this is not desired and in many cases also not permitted. When now holes are provided in the sealing insert, a permanent water circulation can be achieved, that is, the risk that areas with slack water are formed, in which micro-organisms can develop, is substantially reduced. The tightness of the valve is, however, not influenced by the holes.

It is preferred that the holes are arranged in the guiding part. Here, the risk of creation of dead zones between the housing and the sealing insert, in which water can gather, is highest. When the holes are arranged in the guiding part or at least mainly in the guiding part, the risk of creation of dead zones in the guiding part is reduced.

It is advantageous that the sealing insert has at least one clamping area, which can be clamped between at least two housing parts of the housing. For example, it is here possible that such a clamping area of the additional area is inserted in a groove or any other recess, whose shape corresponds to that of the clamping area. A corresponding component of another housing part will then compress the clamping area in the groove when joining the two housing parts. In this way a relatively good sealing between two housing parts can be achieved. Further, such a clamping area in the compressed state ensures a safe retaining of the sealing insert in the housing. Additionally, the recesses made in accordance with the clamping area ensure an exact positioning of the sealing insert during assembly.

Further, it is favourable that the clamping area has a clamping lip, which can be clamped between a top part and a bottom part of the housing. Here, it can, for example, be imagined that when fixing the top part on the bottom part via a flange connection, such a clamping lip is clamped in the flange surface. Here, the clamping lip may also have holes for leading through bolts. This ensures a safe sealing between the top part and the bottom part of the housing. Further, during assembly, such a clamping lip can make the positioning of the sealing insert in the housing easier.

It is favourable that the clamping area has a clamping ring, which can be clamped between the top part or the bottom part of the housing and an inlet part or an outlet part of the housing. Thus, when mounting an inlet or an outlet part on the remaining housing, a safe sealing can be achieved in the corresponding inlet or outlet area.

Preferably, the clamping collar is inserted in a V-shaped groove, in which a V-shaped mounting collar engages radially in relation to the inlet or the outlet part. Thus, in relation to the flow area, the clamping collar extends under an angle, thus engaging in this groove. When now the mounting collar with its corresponding V-shaped embodiment engages in the groove, the clamping collar is not only retained in the groove, it is also to a certain extent clamped. Thus, on the one hand, the required forces for retaining the sealing insert in the housing in a safe manner are provided. On the other hand, the tightness between the inlet part or the outlet part, respectively, and the housing insert is realised with relatively simple measures.

It is preferred that in the area of the groove bottom the clamping collar has a thickening. In a manner of speaking, an O-ring sealing then occurs, which further improves the tightness. Through a compression of the thickened area of the clamping collar it is ensured that the clamping collar is sealed on the full circumference of the connection between the inlet or the outlet part and the housing.

Preferably, the clamping collar has notches on its extreme end. The extreme end is the end, which is not connected with the housing insert. Through the special embodiment with the V-shaped groove, into which the clamping collar is pressed radially outward, an area of the clamping collar occurs, which is led radially inward again. The notches now ensure that in spite of the reduced diameter the clamping collar does not fold, which would cause problems with the tightness.

It is preferred that the notches extend right down to the groove bottom. With this embodiment it is ensured that no areas occur, in which too much material of the clamping collar is available, which could eventually fold.

It is advantageous that the contact area is formed, at least partly, by the additional area. In this way, also the contact area has a relatively flexible embodiment. In the closed state of the gate valve, a good sealing between the sliding element and the sealing insert can thus be ensured.

It is also favourable that the contact area is adapted to the shape of the sliding element. Such an adaptation ensures a good cooperation between the bearing area and the sliding element. Thus, an improved sealing can be achieved.

It is particularly favourable that the sealing insert has a guiding part, in which the sliding element can be guided. In this way also the areas of the gate valve cooperating low material with the sliding element can be made relatively accurately. Thus, a good sealing and a low material wear can be achieved.

It is advantageous that the guiding part branches off from the remaining sealing insert into a control area in the top part of the housing, in which the sliding element is arranged in the open state. Thus, it is achieved that in any position the sliding element is guided by the guiding part over a long distance. Further, in this way, the total area, in which the sliding element is moving, can be formed by the sealing insert. As a result, this gives a particularly exact guiding of the sliding element and a good sealing.

It is also advantageous that the guiding part has a guiding device, which cooperates with at least one guiding counter-part of the sliding element. With such a guiding device an exact guiding of the sliding element in exactly synchronised areas can be realised. In this way a lower wear and a good sealing can be achieved. The guiding counter-part can, for example, be an element with straight edges, which cooperate with corresponding edges of a guiding groove of the guiding device.

Further, it is favourable that the guiding device is formed by the rigid body. This gives a relatively low friction between the guiding device and the sliding element.

Further, it is advantageous that the outside of the guiding part has ribs, which are formed by the rigid body. Such ribs ensure a stable hold of the guiding part in the housing. Thus, an exact guiding of the sliding element can be ensured at any time.

It is also favourable that the complete guiding part is formed by the rigid body. This increases the stability of the guiding part, which ensures a stable operation of the gate valve.

Preferably, the rigid body has a glass fibre reinforcement. A reinforcement by means of glass fibre gives the rigid body a higher mechanical loadability. In other words, it can stand higher forces. This has a positive influence on the life of the sealing insert.

It is particularly preferred that the additional area covers at least 50% of the surface of the rigid body, which gets in touch with water. Thus, on the major part of the surface the additional area ensures that the flowing water does not release glass fibres from the rigid body. Thus, the sealing insert is also suited for drinking water.

Further, this task is solved by a method for the manufacturing of a sealing insert for a gate valve as described above, in which an at least two-stage casting process is carried through. Thus, it is possible to manufacture individual areas of the sealing insert separately with a high accuracy.

Preferably, the rigid body is manufactured in a first stage and the additional area in a second stage. With such a manufacturing method, the various areas of the sealing insert are adapted optimally to each other. Thus, the sealing properties of the sealing insert can be further improved.

BRIEF DESCRIPTION OF THE DRAWINGS

In the following, the invention is described on the basis of a preferred embodiment in connection with the drawings, showing.

DETAILED DESCRIPTION OF THE PREFERRED EMBODIMENTS

Figure 1:
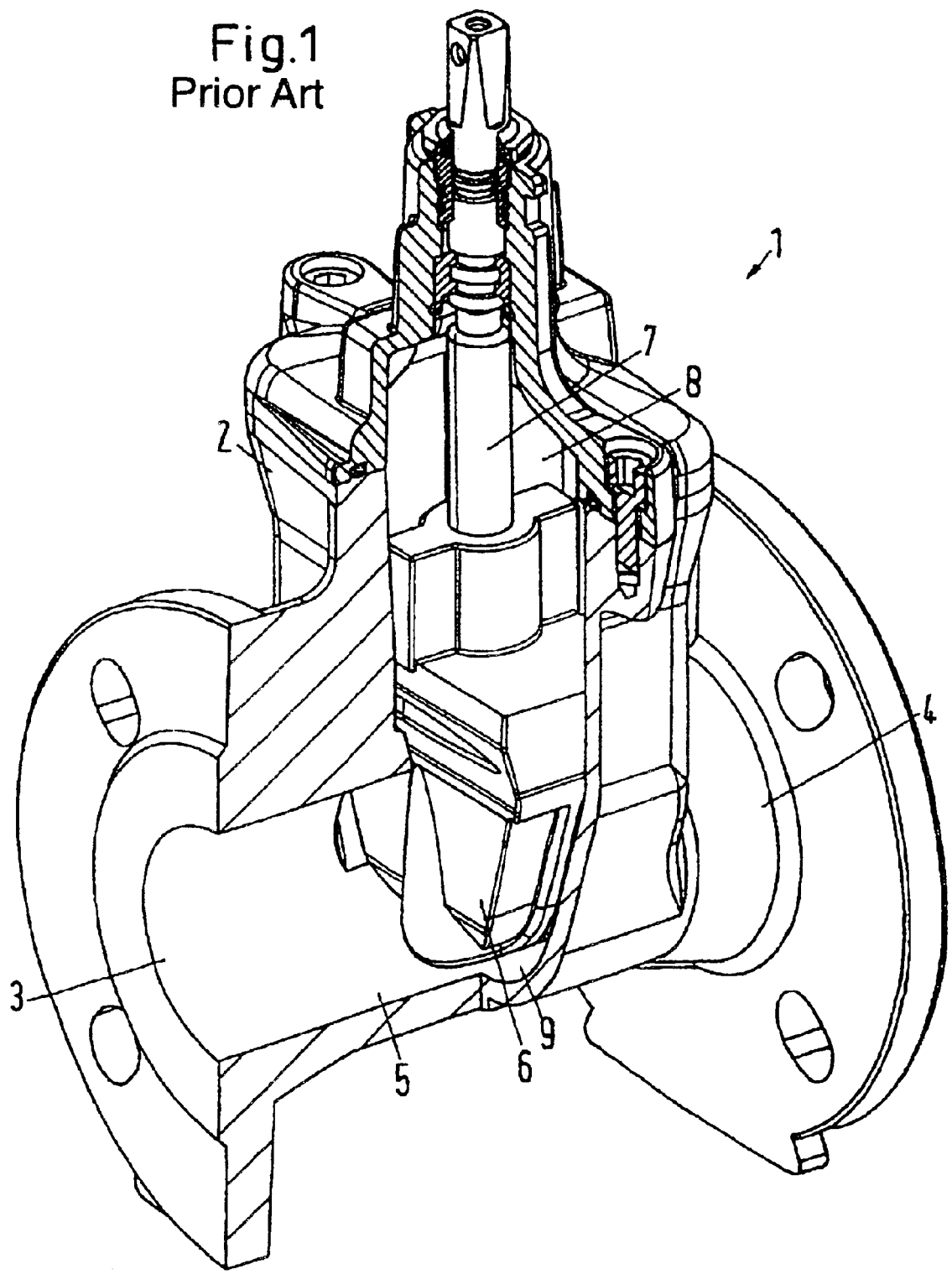
FIG. 1 a partial section through a gate valve according to the state of the art, FIG. 2 a partial section through a gate valve according to the invention, FIG. 3 an exploded view of the gate valve according to FIG. 2, FIG. 4 a partial section through a sealing insert of the gate valve according to Fig. 2 and 3, FIG. 5 an exploded view of the sealing insert according to FIG. 4, FIG. 6 a modified version of a sealing insert, FIG. 7 a partial section through a gate valve with the modified sealing insert, FIG. 8 an enlarged sectional view "X" from FIG. 7, FIG. 9 an exploded view of the sealing insert according to FIG. 6

The gate valve 1 according to the state of the art, shown in Fig. 1, has a housing 2, which typically consists of cast iron coated with epoxy resin. The housing 2 has an inlet 3 and an outlet 4, and between them a flow area 5. Movable into the flow area is a sliding element 6, which can be controlled by a spindle 7. For this purpose, a control area 8 branches off from the flow area 5 in the shape of a T-piece, in which control area 8 the sliding element 6 is guided and a part of the spindle 7 is arranged.

In the open state of the gate valve 1, the sliding element 6 is arranged in the control area 8 of the housing 2. In the closed state of the gate valve 1, the sliding element 6, however, bears on the housing 2 in a contact area 9 in the flow area 5.

The sliding element 6 has a metal core, which is coated with an elastic, vulcanised rubber. In this connection, the coating on two sides of the sliding element 6 cooperates with edges, which project from the housing 2.

Particularly the manufacturing of the areas of the housing 2, which cooperate with the sliding element 6, causes large problems. This is particularly the case, when cast iron is used as material for the housing 2. Tolerances between the housing 2 and the sliding element 6 may occur, which can lead to leakages of the gate valve 1.

Figure 2:
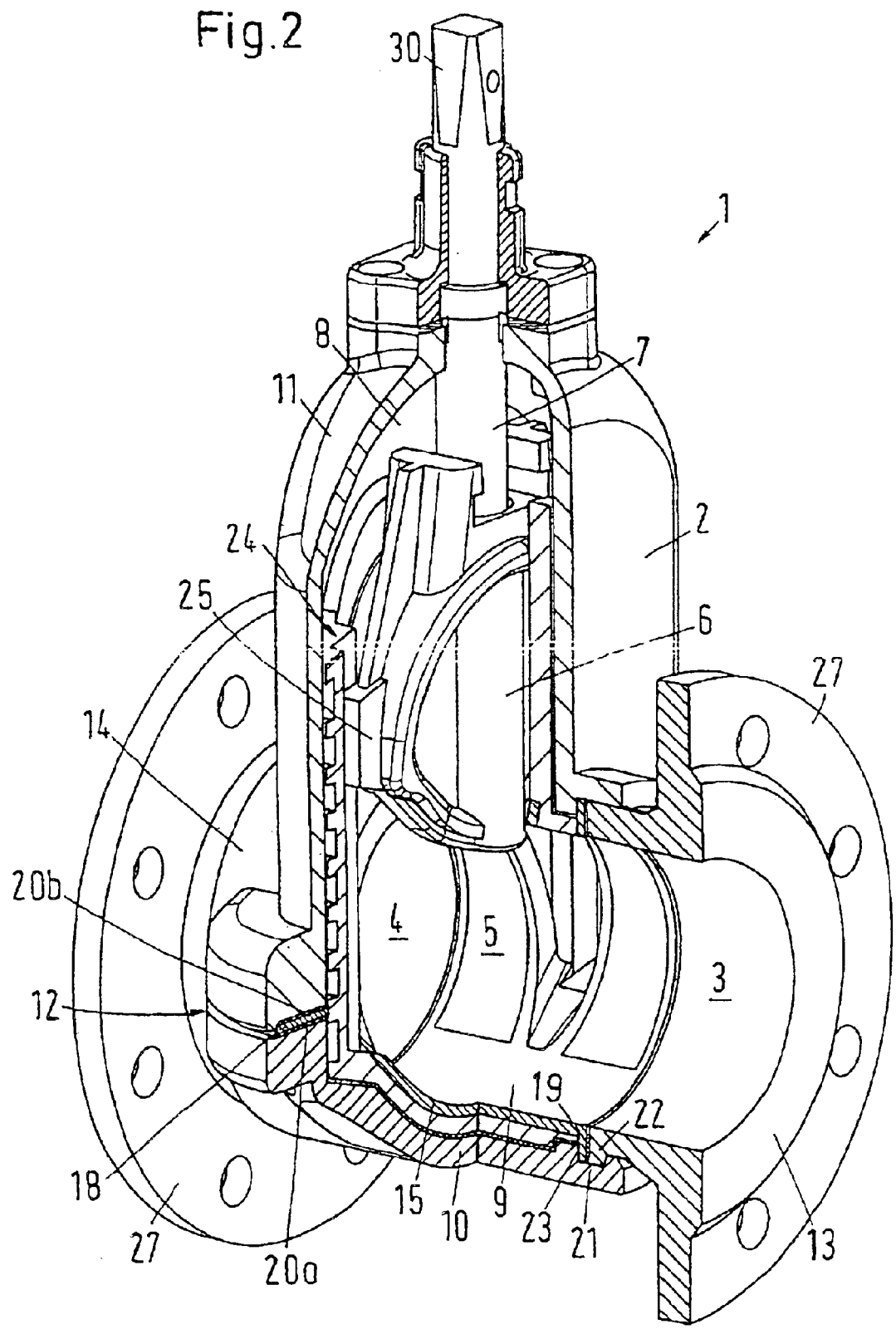

FIG. 2 shows a gate valve 1 according to the present invention. Here, the elements, which correspond to the embodiment according to the state of the art shown in FIG. 1, have the same reference numbers.

Also here, the housing 2 of the gate valve 1 has an inlet 3, an outlet 4 and between them a flow area 5. The housing 2 is built up of four housing parts. The flow area 5 is surrounded by a bottom part 10 and a top part 11, which are connected with each other in two sections via a flange arrangement 12. When dismounting the top part 11 from the bottom part 10, the flow area 5 is thus freely accessible, for example for cleaning or control purposes. Further, an inlet part 13 and an outlet part 14, respectively, are arranged at the inlet 3 and the outlet 4. All housing parts 10, 11, 13, 14 are made to be corrosion resistant. This means that they have a corresponding surface coating or that they are made of a suitable material. As surface coating, epoxy resin is suited.

With the gate valve 1 shown here, the flow through the flow area 5 can be controlled via a sliding element 6, which is controlled via a spindle 7. For this purpose, the sliding element 6 can be moved out of the control area 8 in the top part 11 of the housing 2 into the flow area 5. The sliding element 6 is made of cast iron. Other materials, like for instance stainless steel, brass or plastic can also be used.

In the open state of the gate valve 1, the sliding element 6 is, as known also from the state of the art, arranged in the control area 8. In the closed state of the gate valve 1, the sliding element 6 bears in a contact area 9. In this connection, this contact area 9 is made on a sealing insert 15.

The sealing insert 15 is made in a T-shape, and it can be inserted in and dismounted from or replaced in the gate valve 1, independently of all other components of the gate valve 1. The sealing insert 1 has a tubular part 16, from which a guiding part 17 branches off. The tubular part 16 is arranged in the flow area 5, whereas the guiding part 17 projects into the control area 8. In order to ensure a safe retaining of the sealing insert 15 in the housing 2, the outer shape of the sealing insert 15 is adapted to the areas of the housing 2, on which it bears. Further, a filling material (not shown) can be provided between the housing 2 and the sealing insert 15. In this way, the sealing insert 15 can be made to fit even better into the housing 2.

Further, a good retaining of the sealing insert 15 in the housing 2 is achieved by means of clamping areas 18, 19. In the present embodiment, these are made by means of clamping lips 18 and clamping collars 19. In the assembled state of the gate valve 1 shown here, each clamping area 18, 19 of the sealing insert 15 is clamped between two or three housing parts 10, 11, 13, 14 of the housing 2. Here, the clamping of the clamping lips 18 occurs in the flange arrangement 12 by means of a flange surface 20a, 20b on the bottom part 10 and the top part 11, respectively. The clamping collar 19, however, is clamped in a groove 21, which is made in both the bottom part 10 and the top part 11 in the area of the inlet 3 and/or the outlet 4. Together with the clamping collar 19, a mounting collar of the corresponding inlet part 13 or outlet part 14 is arranged in the groove 21. After the assembly, this mounting collar 22 presses on the clamping collar 19, which is thus clamped between the mounting collar 22 and an inner groove wall 23.

Further, the guiding part 17 of the sealing insert 15 has a guiding device 24. Via this guiding device, the sliding element 6 is guided during displacement. The guiding device 24 of the guiding part 17 cooperates with a guiding counter-part, which is arranged on the sliding element 6. In the embodiment shown, this guiding counter-part 25 is made of approximately rectangular projections, which are arranged on both sides of the sliding element 6. Of course, it is also possible for the guiding device 24 and the guiding counter-part 25 to have any other known and suited shape.

Figure 3:
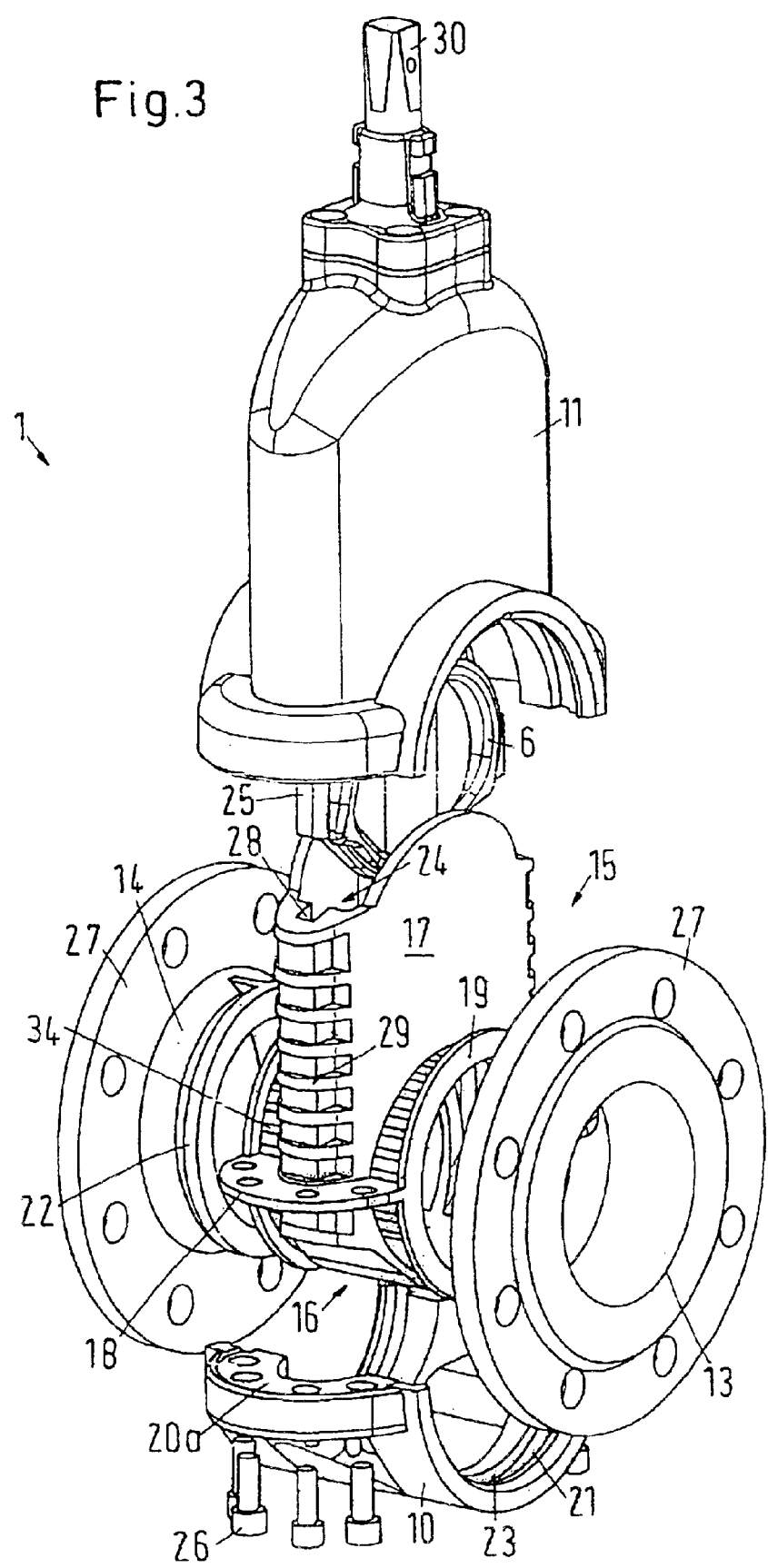

FIG. 3 shows an exploded view of the gate valve 1 according to the embodiment in FIG. 2. It clearly shows the four housing parts of the housing 2, namely the bottom part 10, the top part 11, the inlet part 13 and the outlet part 14. Further, bolts 26 are shown, with which the bottom part 10 can be mounted on the top part 11. One advantage of such a four-part housing 2 is that providing a corresponding inlet part 13 and outlet part 14 makes the gate valve 1 adaptable to different connection forms. In the embodiment shown, both the inlet part 13 and the outlet part 14 have a flange part 27. Alternatively, the inlet part 13 and the outlet part 14 can have connecting parts of any other known or suited connection form. Possible are, for example, connecting parts of a plug-in or screwed connection. Further, an inlet part 13 or an outlet part 14 can be provided, which can be connected via a bush with a line, preferably made of polyethylene (PE). For this purpose, the bush could, for example, have an area, which can be welded onto the PE-line. Further, also a simple tube end can be used for any known welding connection. Besides, the inlet part 13 or the outlet part 14 can be made as a T-piece or any other known shape.

Further, the sealing insert 15 can be seen. The guiding device 24 of the sealing insert 15 has a guiding groove 28 with a square cross-section. This guiding groove 28 cooperates with the guiding counter-part 25 of the sliding element 6.

Additionally, ribs 29 are arranged on the outside of the guiding part 17. On the one hand, they ensure that in the control area 8 the guiding part 17 bears safely on the top part 11 of the housing 2. On the other hand, the ribs 29 increase the stability of the guiding part 17.

When assembling the gate valve 1, the sealing insert 15 is first placed in the bottom part 10 of the housing 2. The clamping lips 18 and the clamping collar 19 are arranged at the flange surfaces 20a, 20b and the grooves 21, respectively, provided for this purpose, which ensures an exact positioning of the sealing insert 15 in relation to the bottom part 10. Then the mounting collars 22 of the inlet part 13 and the outlet part 14 are inserted in the groove 21. Now, on these first three housing parts 10, 13, 14 of the housing 2, the top part 11 is mounted, in which the sliding element 6 and the spindle 7 have already been mounted. On both sides of the sliding element 6, the guiding counterparts 25 are inserted in the guiding grooves 28 of the guiding device 24 of the sealing insert 15. Then, the top part 11 and the bottom part 10 are tightened to each other by means of bolts 26. Finally, the gate valve 1 can be mounted in a fluid circuit, for example a utility water system, by means of the flange parts 27 of the inlet part 13 and the outlet part 14, respectively.

For the control of a flow, the gate valve 1 can now be opened or closed. For this purpose, the sliding element 6 is displaced by means of the spindle 7. For the operation of the spindle 7, the gate valve 1 has on its top part 11 a control connection 30. A handwheel, a motor or any other known and suited operating device can be connected to this control connection 30.

Figure 4:
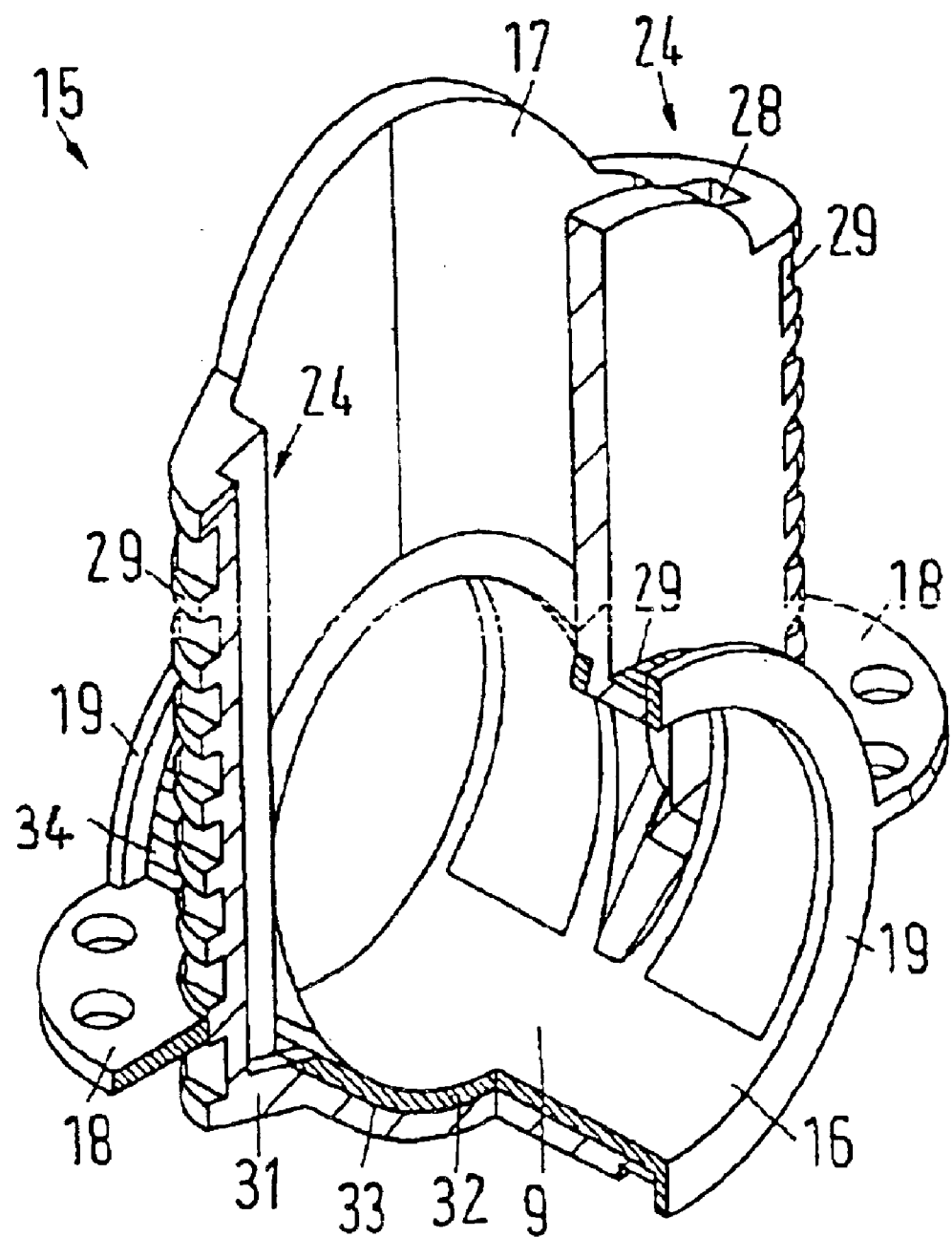

FIG. 4 shows a partial section through the sealing insert 15. It can be seen from the cut surfaces that the sealing insert 15 consists of two parts, namely a rigid body 31 (widely hatched) and an additional area 32 (tightly hatched). In the contact area 9, the additional area 32 also assumes sealing tasks in cooperation with the sliding element 6, and can therefore also be called sealing area. The sealing insert 15 is made of a plastic material, the plastic material having in the area of the rigid body 31 a rigid material component and in the additional area 32 a soft material component. In a preferred manner, the rigid material component consists of polyoxymethylene (POM) and the soft material component of ethylene/propylene diene monomer (EPDM). Both material components of the rigid body 31 and the additional area 32 are connected with each other in the connecting areas 33 on the molecular level.

In the embodiment shown, the rigid body 31 extends over the complete sealing insert 15. Here, the complete guiding part 17 is exclusively formed by the rigid body 31.

Particularly in the area of the guiding device 24 this is very important, to ensure that the displacement of the sliding element 6 causes as little friction as possible. The clamping lips 18 and the clamping collar 19, on the other hand, are formed by the additional area 32. In this way, the use of the soft material component ensures a good deformability of these clamping areas 18, 19. In the assembled state of the gate valve 1 a better sealing can thus be achieved between the individual parts 10, 11, 13, 14 of the housing 2.

The additional area 32 is also arranged in the contact area 9, with which the sliding element 6 cooperates in the closed state of the gate valve 1. With the good deformability of the contact area 9, which is obtained by this, a better sealing between the sliding element 6 and the sealing insert 15 is achieved. Additionally, the shape of the contact area 9 is adapted to the sliding element 6. In the area cooperating with the contact area, the sliding element 6 has an approximate V-shape. Also the adaptation of the contact area 9 to this V-shape ensures a good sealing in the closed state of the gate valve 1.

Figure 5:
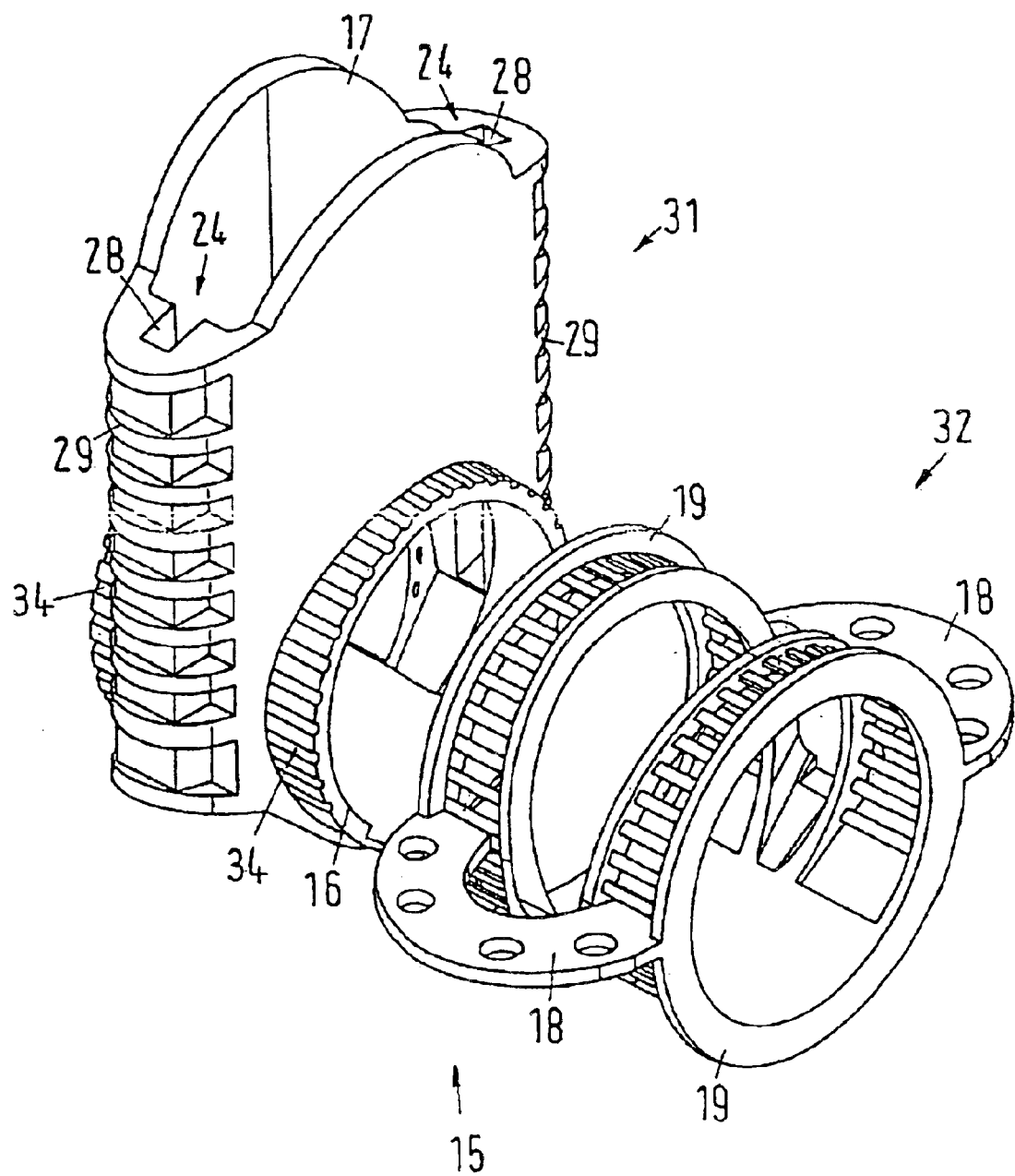

FIG. 5 shows the rigid body 31 and the additional area 32 in separate views. The sealing insert 15 shown is manufactured in a two-stage casting process. Preferably, the rigid material component required for the manufacturing of the rigid body 31 is fed into a casting mould. The soft material component of the additional area 32 is subsequently moulded on to the rigid body 31 thus appearing. In order to achieve a complete distribution of the soft material component across the intended areas during the second moulding process, distribution flutes are formed on the rigid body 31 during the first moulding process. By means of this manufacturing process, the rigid body 31 and the additional area 32 of the sealing insert 15 are optimally adapted to and fixedly connected with each other. The additional area 31 is arranged both inside and outside the rigid body 31.

The FIGS. 6 to 9 show a modified embodiment of a sealing insert 15. Same parts have the same reference numbers as in FIGS. 1 to 5.

One change is that the sealing insert 15 is provided with openings 51, 52, through which water or another fluid controlled by the gate valve can enter an area between the sealing insert 15 and the housing 2. The openings 51 are arranged in the guiding part 17. The openings 51 are arranged at the lower end of the guiding part 17, shortly above the clamping lips 18. The openings 51, 52 penetrate both the rigid body 31 and the additional area 31. They can be produced already during the moulding of the sealing insert 15. However, it is also possible to make them later, for example by means of boring or milling.

With regard to the rigid body 31, the opening 52 arranged in such a way that it is situated between the ribs 29. Therefore it is difficult to see in FIG. 9.

In a manner not shown in detail, the rigid body 31 is made of a plastic material, which is reinforced with glass fibres. Instead of glass fibres, other sorts of reinforcement fibres can be used, for example carbon fibres. The additional area 31 is made in such a way that it covers at least 50% of the surface of the rigid body 31, which gets in touch with the water flowing through the gate valve 1. In the surfaces, which are covered by the additional area 31, a contact between the water and the glass fibre reinforced plastic material is avoided, which improves the opportunity of avoiding the risk that glass fibres are washed out of the plastic material of the rigid body 31.

Figure 7:
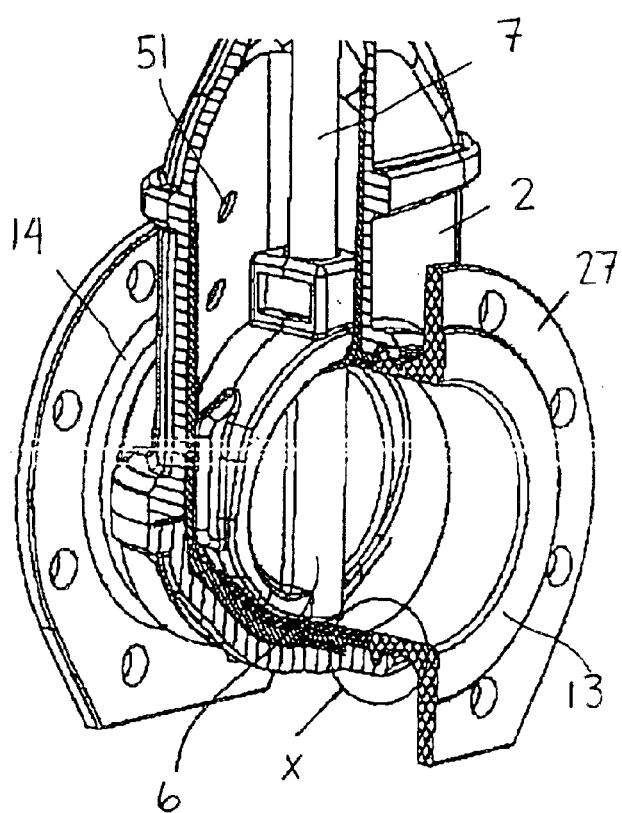
Figure 8:
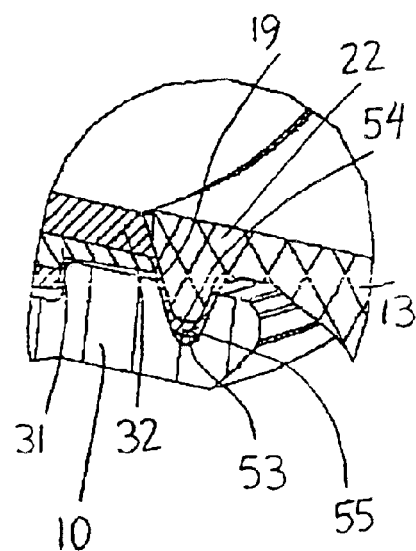

As can be seen from the FIGS. 7 and 8, the design of the clamping collar 19 has also been changed. The clamping collar 19 forms a "tubular" extension of the flow area 5. In a part 60 of the extension, it expands in a cone shape, that is, the diameter increases in this part 60. In a second part 61 the extension has a substantially constant diameter.

The clamping collar 19, possibly having a somewhat smaller thickness than, but being made in one piece with the additional area 32, is inserted in a V-shaped groove 53 on the bottom part 10 and the top part 11, and is here retained by a circumferential, V-shaped projection on the inlet part 13. A corresponding embodiment, not shown in detail, is available on the outlet part 14. The clamping of the clamping collar 19 between the top part 11 and the inlet part 13 and likewise between the bottom part 10 and the inlet part 13, prevents contact between the parts 11 and 13 and also between the parts 10 and 13. Thus, a damage of a possible coating (for example epoxy resin) of the parts 10, 11, 13, 14 is prevented. The same consideration also applies for the outlet part 14.

In the area of the groove bottom of the groove 53, the clamping collar 19 is thickened, that is, has a thickening 55, which forms some sort of an O-ring seal. It is not absolutely required that during mounting of the inlet part 13 on the housing 10, 11 the thickening 55 is compressed at the deepest spot of the groove 53. However, the thickening 55 is shaped so that an extensive bearing of the clamping collar 19 is ensured on both the inlet part 13 and on the bottom part 10 or the top part 11, respectively, of the housing 2.

Figure 6:
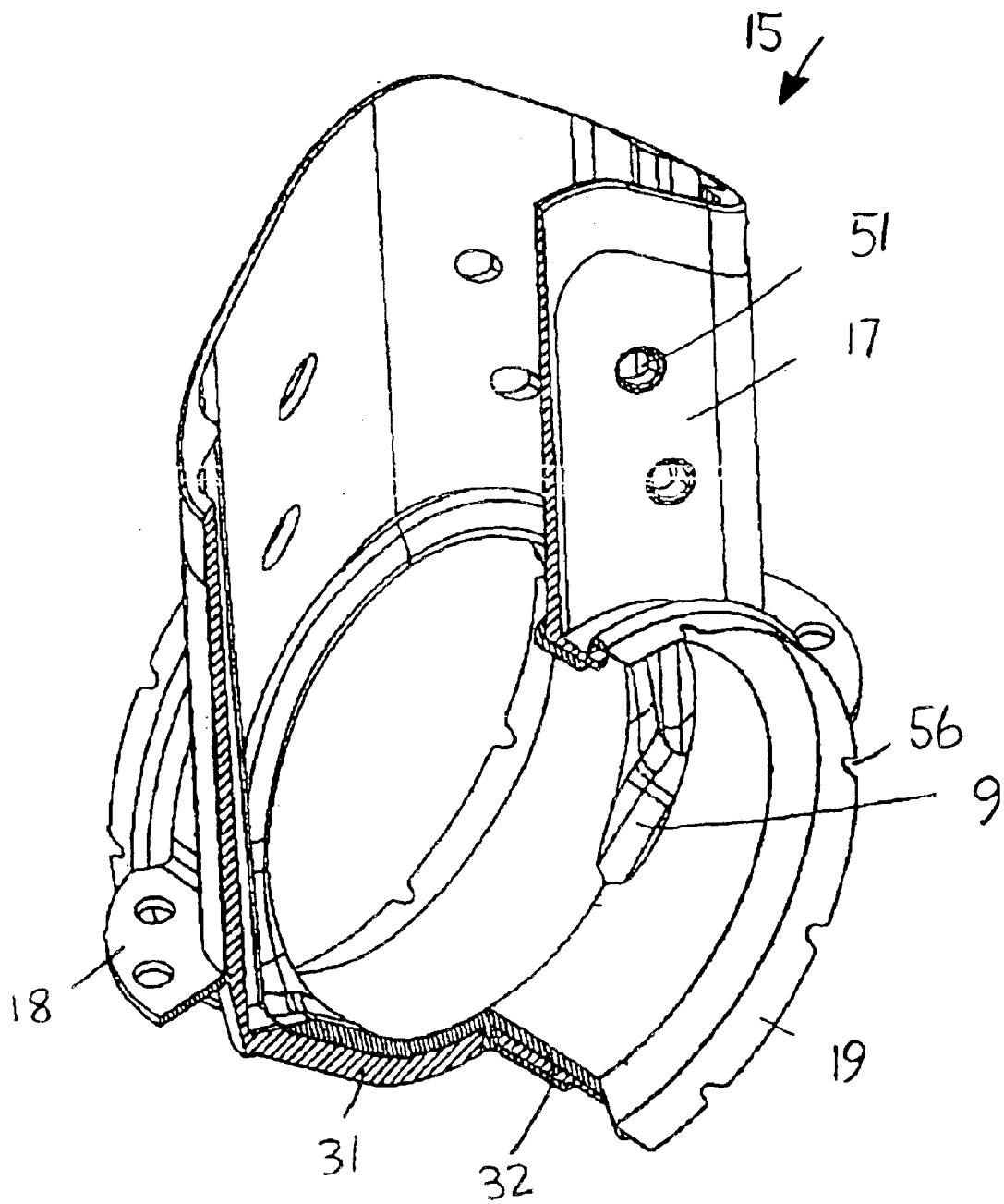
Figure 9:
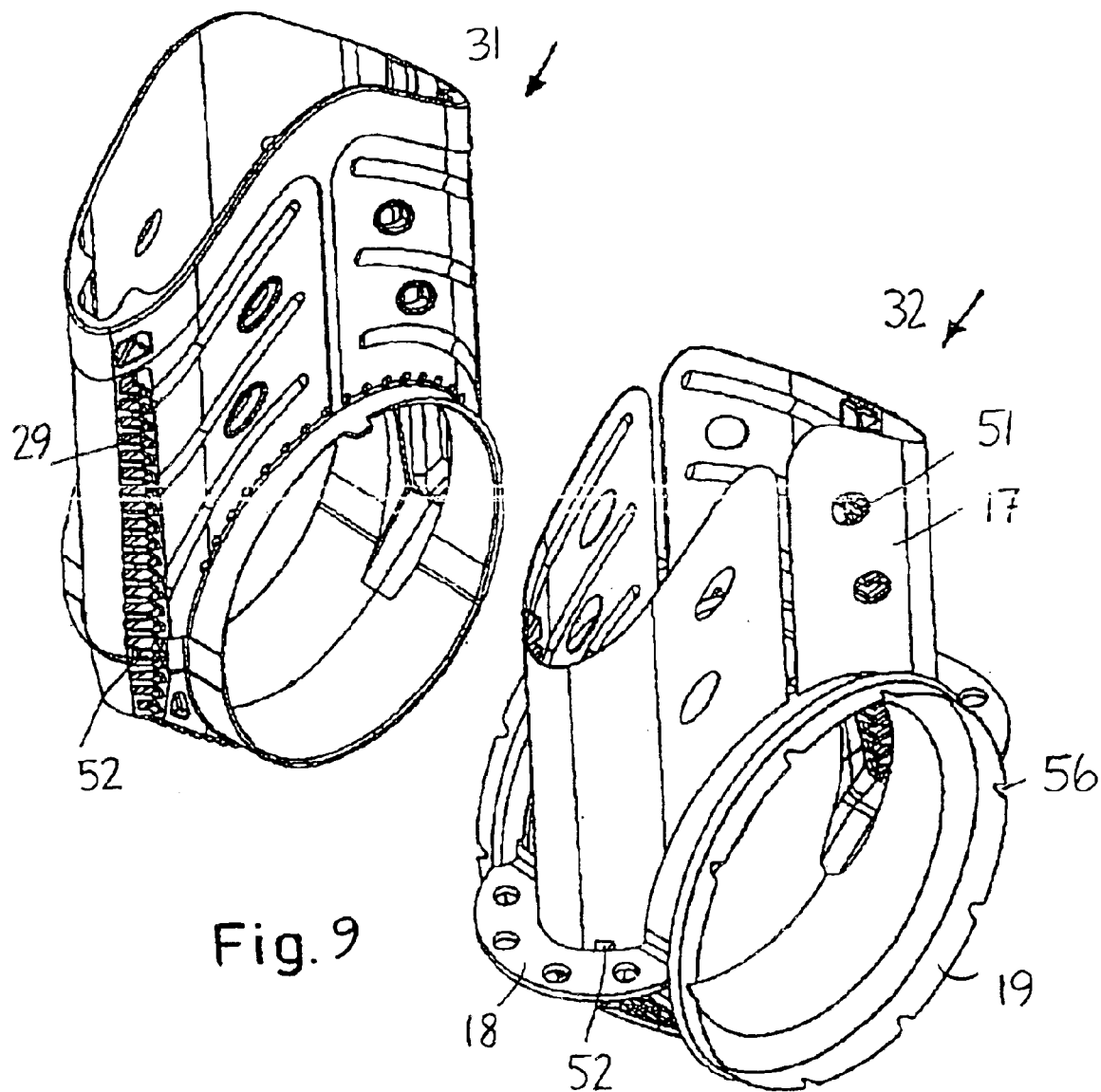

As appears particularly from the FIGS. 6 and 9, the clamping collar 19 has notches 56, which are arranged in the circumferential direction. As can be seen from FIG. 8, the clamping collar 19 is led radially inward again outside the groove bottom of the groove 53. If not for the notches 56, there would be a risk that folds could appear, which again could influence the tightness of the connection between the inlet part 13 and the housing 2. Through the notches 56, this risk no longer exists.

With the embodiment of the clamping collar 19 shown in FIG. 8, an excellent tightness of the sealing insert 15 in the housing 2 appears. When the inlet part 13 with its projection 54 is inserted in the groove 53, the clamping collar is strained. At the same time, the clamping collar 19 is compressed in the area of the thickening 55. This ensures a tight transition between the inlet part 13 and the sealing insert 15.

We claim:

1. A gate valve having a housing comprising a bottom part and a top part separated by a flange connection; a first side part comprising a housing inlet and a second side part comprising a housing outlet; clamping connections between said first side part and the bottom and top parts and between said second part and the bottom and top parts, respectively; and a sealing insert clamped between said bottom part, said top part and the said first and second parts; and a sliding member adapted for sliding movement in said housing between a first position in which it establishes a gate barrier between said inlet and said outlet and a second position in which said gate barrier is removed, said sealing insert having an opening opposing said inlet and said outlet, and further having a contact area adapted for sealing contact with said sliding member during said member's sliding movement between said positions, said sealing contact establishing said barrier when said sliding member is in said first position, said gate valve being characterized in that:

the sealing insert comprises a rigid body permanently connected to areas having less rigidity than said rigid body, said areas with less rigidity including said contact area and clamped areas in said flange connection and areas clamped between said first side part and the bottom and top parts and between said second side part and the bottom and top parts.

2. A gate valve according to claim 1, wherein said permanent connection is on a molecular level.

3. A gate valve according to claim 1, wherein said sealing insert comprises a guiding part for said sliding member extending in said top part.

4. A gate valve according to claim 1, wherein the sealing insert comprises a plastic material.

5. A gate valve according to claim 4, wherein the plastic material has a rigid and a soft material component, the rigid body being formed substantially by the rigid material component and the areas having less rigidity being formed substantially by the soft material component.

6. A gate valve according to claim 5, wherein the rigid material component is made of polyoxymethylene (POM).

7. A gate valve according to claim 5, wherein the soft material component is made of ethylene/propylene diene monomer (EPDM).

8. A gate valve according to claim 1, wherein a filling material is arranged between the sealing insert and the housing.

9. A gate valve according to claim 1, wherein the sealing insert is provided with holes.

10. A gate valve according to claim 9, wherein the holes are arranged in the guiding part.

11. A gate valve according to claim 1, wherein the sealing insert has at least one clamping area, which can be clamped between at least two housing parts of the housing.

12. A gate valve according to claim 11, wherein the clamping area has a clamping lip, which can be clamped between the top part and the bottom part of the housing.

13. A gate valve according to claim 11, wherein the clamping area has a clamping collar, which can be clamped between the top part or the bottom part and the first side part or the second side part of the housing.

14. A gate valve according to claim 13, wherein the clamping collar is inserted in a V-shaped groove, in which a V-shaped mounting collar engages radially in relation to the inlet or the outlet.

15. A gate valve according to claim 14, wherein in the area of the groove bottom of the groove the clamping collar has a thickening.

16. A gate valve according to claim 13, wherein the clamping collar has notches on its extreme end.

17. A gate valve according to claim 16, wherein the notches extend right down to the groove bottom.

18. An insert for assembly in a gate valve housing having an inlet and an outlet, between which a flow area is arranged, said valve insert comprising a tubular part arranged in the flow area and adapted for receiving a sliding element, wherein the tubular part comprises a rigid body of which at least a portion is permanently connected to a material of a rigidity less than that of said rigid body for sealing engagement with a portion of the sliding element, wherein said permanent connection is on a molecular level.

19. An insert for assembly in a gate valve housing having an inlet and an outlet, between which a flow area is arranged, said valve insert comprising a tubular part arranged in the flow area and adapted for receiving a sliding element, wherein the tubular part comprises a rigid body of which at least a portion is permanently connected to a material of a rigidity less than that of said rigid body for sealing engagement with a portion of the sliding element, wherein the insert comprises a plastic material, and wherein the plastic material has a rigid and a soft material component, the rigid body being formed substantially by the rigid material component and the material of a rigidity less than that of the rigid body being formed substantially by the soft material component.

20. An insert according to claim 19, wherein the rigid material component is made of polyoxymethylene (POM).

21. An insert according to claim 19, wherein the soft material component is made of ethylene/propylene diene monomer (EPDM).

22. An insert according to claim 18, wherein a filling material is provided and is configured to be arranged between the insert and the housing.

23. An insert according to claim 18, wherein the insert is provided with holes.

24. An insert according to claim 23, wherein the holes are arranged in a guiding part, in which the sliding element can be guided.

25. An insert according to claim 18, wherein the insert has at least one clamping area, which can be clamped between at least two housing parts of the housing.

26. An insert according to claim 25, wherein the clamping area has a clamping lip, which can be clamped between a top part and a bottom part of the housing.

27. An insert according to claim 25, wherein the clamping area has a clamping collar, which can be clamped between a top part or a bottom part and the inlet or the outlet of the housing.

28. An insert according to claim 27, wherein the clamping collar is configured to be inserted in a V-shaped groove and to be held in place by a V-shaped mounting collar which engages the V-shaped groove radially in relation to the inlet or the outlet.

29. An insert according to claim 28, wherein, in the area of the groove bottom of the groove into which the clamping collar is configured to be inserted, the clamping collar has a thickening.

30. An insert according to claim 27, wherein the clamping collar has notches on its extreme end.

31. An insert according to claim 30, wherein the notches are configured to extend right down to a groove bottom into which the clamping collar is configured to be inserted.

32. A sealing insert for use with a gate valve having a sliding member and a housing including a bottom part and a top part separated by a flange connection, a first side part including a housing inlet, a second side part including a housing outlet, clamping connections between the first side part and the bottom and top parts and clamping connections between the second part and the bottom and top parts, respectively, the sliding member adapted for sliding movement in the housing between a first position in which it prohibits a flow between the housing inlet and the housing outlet and a second position in which a flow between the housing inlet and the housing outlet is not prohibited, the sealing insert comprising:

an opening adapted to accommodate sliding movement of the sliding member of the gate valve; and a rigid body permanently connected to areas having less rigidity than said rigid body, said areas with less rigidity including a contact area adapted for sealing contact with the sliding member of the gate valve and clamped areas adapted to be clamped in said flange connection and adapted to be clamped between said first side part and the bottom and top parts and between said second side part and the bottom and top parts.

33. A sealing insert according to claim 32, wherein the sealing insert comprises a plastic material.

34. A sealing insert according to claim 32, wherein the plastic material has a rigid and a soft material component, the rigid body being formed substantially by the rigid material component and the areas having less rigidity being formed substantially by the soft material component.

35. A sealing insert according to claim 34, wherein the rigid material component is made of polyoxymethylene (POM).

36. A sealing insert according to claim 34, wherein the soft material component is made of ethylene/propylene diene monomer (EPDM).

37. A sealing insert according to claim 32, wherein the clamping areas adapted to be clamped between said first side part and the bottom and top parts and between said second side part and the bottom and top parts each have a clamping collar, which can be clamped between the top part or the bottom part and the first side part or the second side part.

38. A sealing insert according to claim 37, wherein the clamping collar is inserted in a groove, in which a mounting collar engages radially in relation to the housing inlet or the housing outlet.

* * * * *